United States Patent
Burrows et al.

(10) Patent No.: US 7,428,524 B2
(45) Date of Patent: Sep. 23, 2008

(54) LARGE SCALE DATA STORAGE IN SPARSE TABLES

(75) Inventors: Michael Burrows, Palo Alto, CA (US); Fay Wen Chang, Greenwich, CT (US); Jeffrey A. Dean, Palo Alto, CA (US); Andrew B. Fikes, Los Altos, CA (US); Sanjay Ghemawat, Mountain View, CA (US); Wilson C. Hsieh, New York, NY (US); Deborah Anne Wallach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 11/197,925

(22) Filed: Aug. 5, 2005

(65) Prior Publication Data
US 2007/0033354 A1 Feb. 8, 2007

(51) Int. Cl.
G06F 17/30 (2006.01)
(52) U.S. Cl. ................................. 707/2; 707/9; 707/101
(58) Field of Classification Search ........................ None
See application file for complete search history.

(56) References Cited

U.S. PATENT DOCUMENTS

| | | | | |
|---|---|---|---|---|
| 5,386,559 | A | 1/1995 | Eisenberg et al. | 395/600 |
| 5,668,352 | A * | 9/1997 | Christian et al. | 178/18.02 |
| 5,729,730 | A * | 3/1998 | Wlaschin et al. | 707/3 |
| 6,182,121 | B1 * | 1/2001 | Wlaschin | 709/215 |
| 6,289,358 | B1 | 9/2001 | Mattis et al. | 707/203 |
| 6,728,727 | B2 * | 4/2004 | Komine et al. | 707/103 R |
| 7,237,062 | B2 * | 6/2007 | Lubbers et al. | 711/114 |
| 2003/0200235 | A1 | 10/2003 | Choy et al. | 707/203 |
| 2005/0149584 | A1 | 7/2005 | Bourbonnais et al. | 707/204 |

OTHER PUBLICATIONS

International Search Report for International Application No. PCT/US2006/028236, mailed Feb. 8, 2007.

Elmasri, R., et al., Portions of Chapters 24 and 25 of Fundamentals of Database Systems, Addison-Wesley, Reading, MA, 2004, pp. 767-819.

Gamal-Eldin, M.S., et al., "Integrating Relational Databases with Support for Updates," Proceedings of 1988 Int'l Symposium on Databases in Parallel and Distributed Systems, Dec. 5, 1988, pp. 202-209.

(Continued)

Primary Examiner—Christian P. Chace
Assistant Examiner—Jacques Veillard
(74) Attorney, Agent, or Firm—Morgan, Lewis & Bockius LLP

(57) ABSTRACT

Each of a plurality of data items is stored in a table data structure. A row identifier and column identifier are associated with each respective data item, and each respective item is stored at a logical location in the table data structure specified by its row identifier and column identifier. A plurality of data items is stored in a cell of the table data structure, and a timestamp is associated with each of the plurality of data items stored in the cell. Each of the data items stored in the cell has the same row identifier, the same column identifier, and a distinct timestamp. In some embodiments, each row identifier is a string of arbitrary length and arbitrary value. Similarly, in some embodiments each column identifier is a string of arbitrary length and arbitrary value.

23 Claims, 6 Drawing Sheets

OTHER PUBLICATIONS

Kouramajian, V., et al., "Mapping of 2-D Temporal Extended ER models in Temporal FNF and NFNF Relational Models," Int'l Conf on the Entity-Relationship Approach, Amsterdam, Netherlands, Oct. 23, 1991, pp. 671-689.

Barroso, L., et al., "Memory System Characterization of Commercial Workloads," Proceedings of the 25th International Symposium on Computer Architecture, Barcelona, Jun. 1998, pp. 3-14.

* cited by examiner

Physical Storage of Locality Group Files (key-value pairs)

| Row.ColFam.Col.Timestamp | Value |
|---|---|
| Row.ColFam.Col.Timestamp | Value |

LARGE SCALE DATA STORAGE IN SPARSE TABLES

RELATED APPLICATIONS

This application is related to U.S. patent application Ser. No. 11/197,924, "Storing a Sparse Table Using Locality Groups", filed Aug. 5, 2005, which application is incorporated by reference herein in its entirety.

This application is related to U.S. patent application Ser. No. 11/197,923, "Data Reconstruction from Shared Update Log", filed Aug. 5, 2005, which application is incorporated by reference herein in its entirety.

This application is related to U.S. patent application Ser. No. 11/197,922, "Data Compression of Large Scale Data Stored in Sparse Tables", filed Aug. 5, 2005, which application is incorporated by reference herein in its entirety.

TECHNICAL FIELD

The disclosed embodiments relate generally to data storage in distributed computer systems, and more particularly to data storage in sparse tables.

BACKGROUND

Table data structures, and particularly tables in database management systems, are used to store large amounts of data. The demand for efficient data storage for a variety of data intensive applications continues to grow. However, for many such data intensive applications, table data structures have been assumed to be an inappropriate mechanism for storing much of the data generated or obtained by those applications. Furthermore, there appears to be little appreciation that the paradigms associated with table data structures would be very useful in those applications.

For instance, the web pages downloaded during a crawl of the World Wide Web (WWW) are typically stored as a set of files, not as entries in a table or a database table. Similarly, RSS feeds (which can be considered to be documents) downloaded by RSS feed aggregators and other computers are typically stored as files. Storing web content, RSS feed content and the like as individual files is traditional and the mechanisms for managing and accessing such files are well established. The present invention, on the other hand, provides a data model and a set of data management processes and mechanisms for storing large amounts of data in one or more table data structures, thereby providing an alternative to the traditional model of storing individual content items in individual files.

SUMMARY

Each of a plurality of data items is stored in a table data structure. A row identifier and column identifier are associated with each respective data item, and each respective item is stored at a logical location in the table data structure specified by its row identifier and column identifier. A plurality of data items is stored in a cell of the table data structure, and a timestamp is associated with each of the plurality of data items stored in the cell. Each of the data items stored in the cell has the same row identifier, the same column identifier, and a distinct timestamp.

In some embodiments, each row identifier is a string of arbitrary length and arbitrary value. Similarly, in some embodiments each column identifier is a string of arbitrary length and arbitrary value.

In some embodiments, a first set of data access permissions are associated with a first group of columns in the table data structure, and a second set of data access permissions are associated with a second group of columns in the table data structure. The first and second groups of columns are non-overlapping groups of columns and the first and second sets of data access permissions may differ with respect to the data access permissions granted to at least one user or group of users.

BRIEF DESCRIPTION OF THE DRAWINGS

FIG. 5A is a block diagram of the files and memory state used by one server to store tablets (portions of tables) and updates to the tablets, while FIG. 5B is a block diagram of the content of a single data file, sometimes called a locality group file.

Like reference numerals refer to corresponding parts throughout the drawings.

DESCRIPTION OF EMBODIMENTS

Figure 1:
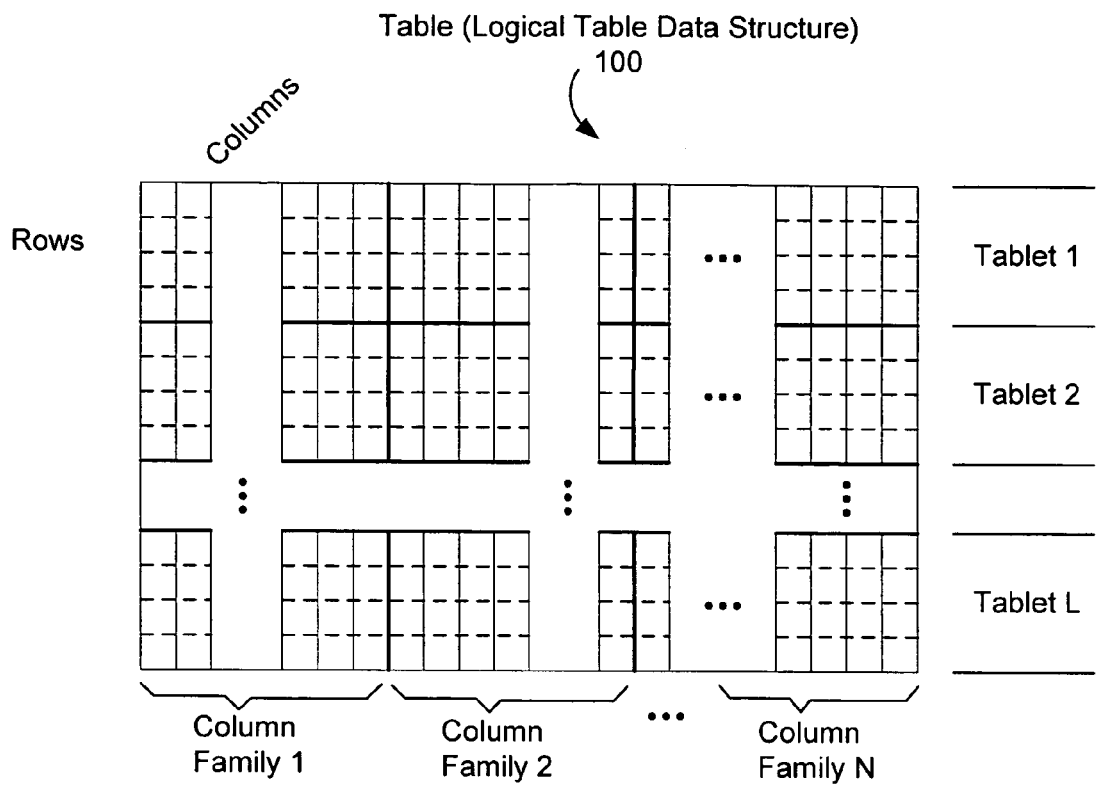
FIG. 1 is a conceptual block diagram of a table data structure.

FIG. 1 is a conceptual block diagram of a table data structure 100. Like an ordinary table, the table data structure has rows and columns. The columns are grouped into column families. Thus, each column family of a table includes one or more columns of the table. Contiguous sets of the rows are grouped to form "tablets." A tablet contains all the data in the table in a corresponding set of rows. The table 100 is sorted (at least conceptually) by row, sometimes called the row identifier. Thus, if the contents of the table were to be scanned from beginning to end, the contents would be accessed in row order. Existing tablets can be split to increase the number of tablets, or merged to reduce the number of tablets.

The column family is the basic unit for controlling accessing to data. Thus, if the administrator of a table wants to restrict access to the contents in a first set of columns, but to allow unrestricted or less restricted access to a second set of columns, the columns in the first set are assigned to a first column family while the columns in the second set of assigned to a second (i.e., different) column family. As described below, the metadata for the table includes separate sets of security parameters (sometimes called access control parameters) for each column family of the table. When a column family has no access restrictions, the security parameters may either be set to default values, or in some embodiments, those security parameters need not be stored in the table's metadata at all.

The tablet is the basic logical unit of storage for purposes of distributing portions of a table across a set of files. Tablets are logical units of storage, as opposed to physical units of storage, because the content of a tablet may be stored in multiple files. In fact, as described below, even a relatively simple tablet will be stored in more than file (at least temporarily) if the content of the tablet is updated. Tablets are sometimes herein called data sets.

In some embodiments, each row identifier is a string of arbitrary length and arbitrary value. Similarly, in some embodiments each column identifier is a string of arbitrary length and arbitrary value. In other words, in these embodiments, there are no length limitations and no (or few) value limitations placed on row and column names or identifiers. In some other embodiments, restrictions may be placed on the value of a row or column identifier. For example, the column identifier string may have to comply with a rule that disallows use of particular characters or symbols, or that requires the use of only printable characters or symbols. The rule may further disallow the use of a particular printable character, such as the colon character, except as a separator between first and second portions of the column identifier. In some embodiments, column names are segmented into a column family portion and a qualifier portion (sometimes called the column portion), separated by a predefined separator character or symbol. For example, a column name may have format such as cf1:c2, where the colon is the separator character. In these embodiments, the column family name and the qualifier portion of a column name can each be arbitrarily long and have arbitrary value; however the column family name may have to comply with a rule that disallows use of the predefined separator character in the column family name and/or in the qualifier portion of the column name.

Figure 2:
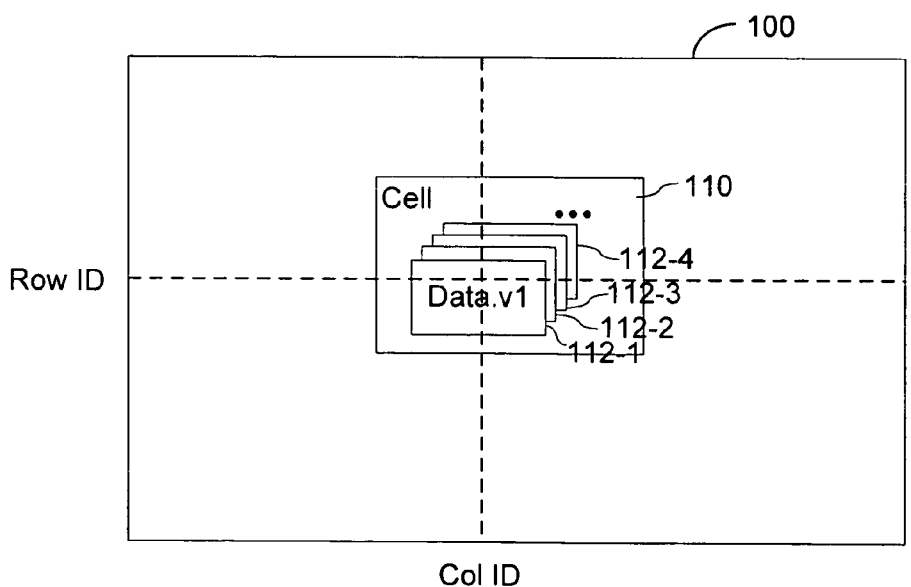
FIG. 2 is a conceptual block diagram illustrating storage of multiple versions of a data item in a single cell of a table.

As shown in FIG. 2, a cell 110 in a table 100 represents the junction of a specified row (Row ID) and column (Col ID). Furthermore, multiple versions 112 of a data item can be stored in a single cell of a table. Each version of the data is assigned either a version number or timestamp. In the remainder of this document, each data item is described as having an associated timestamp, but it is to be understood that the timestamp may be replaced by or treated as a version number.

Figure 3:
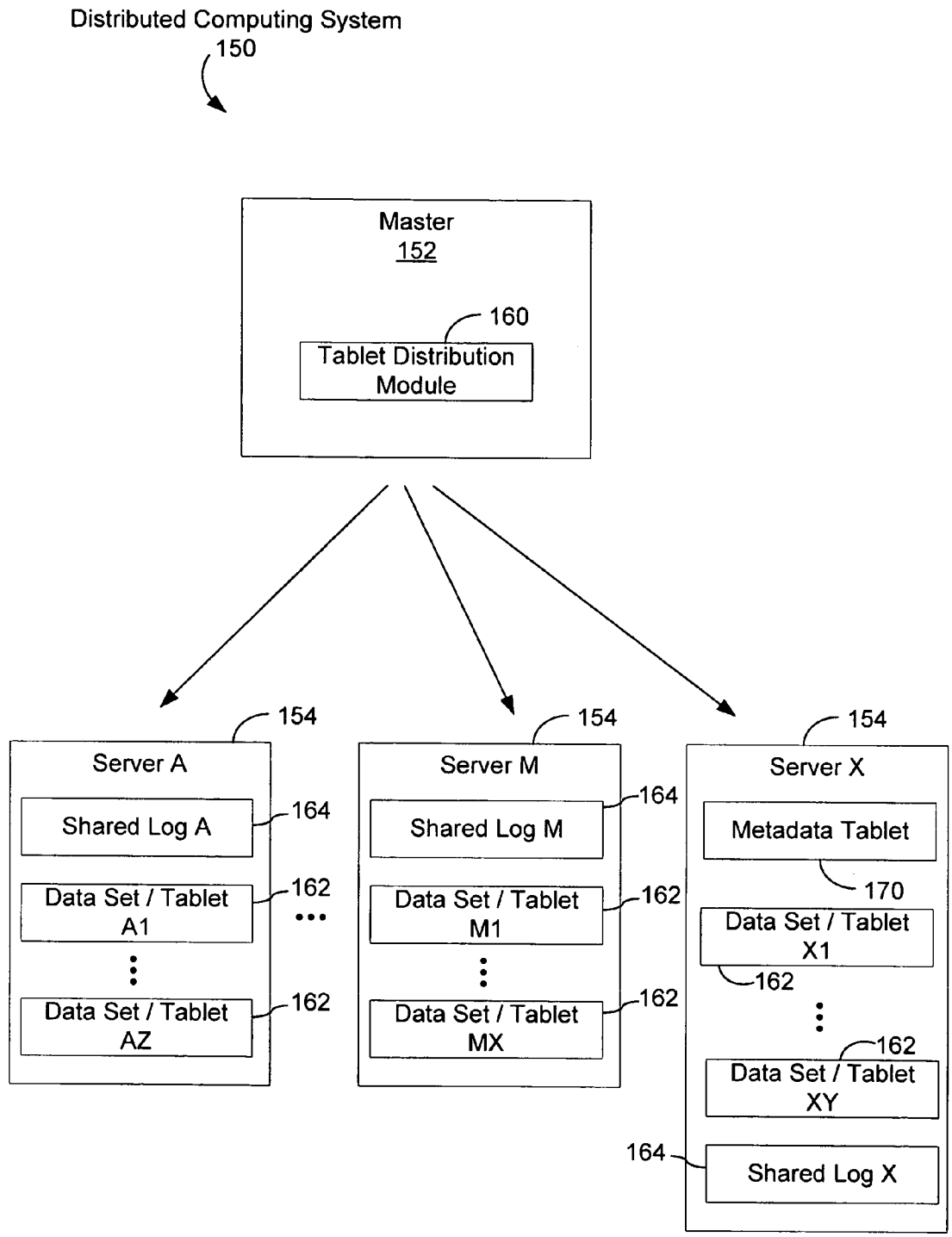
FIG. 3 is a block diagram illustrating a distributed system having a master and a plurality of data servers.

FIG. 3 is a block diagram illustrating a distributed computing system 150 having a master computer 152 and multiple servers 154, sometimes herein called data servers or tablet servers. The master computer 152 has a module 160 or programs for distributing tablets (table portions) among the servers 154. Each server 154 stores a plurality of tablets 162. The number of tablets may vary from one server to another. The master 152 may allocate tablets to servers based on load balancing criteria, resource availability, and other criteria. In some embodiments, a single system 150 (sometimes called a data center) includes hundreds or thousands of servers 154, and the number of tablets 162 stored in a single system may number in the thousands, hundreds of thousands or millions.

Each server 154 also has a shared log 164, which stores update records reflecting changes made to the tablets allocated to that server 154. The shared log 164 is stored as a sequence of files, each of which is automatically replicated by a distributed file system so that instances (sometimes called replicas or copies) of the file are stored on at least three distinct servers 154. Similarly, each of the files that stores the contents of the tablets is automatically replicated by the distributed file system so that instances (sometimes called replicas or copies) of the file are stored on at least three distinct servers. As a result, when a server 154 fails, all of the tablet files and log files of the failed server are available on other servers of the system. When recovering from a server failure, the master 152 reallocates all the tablets of the failed server to other servers 154, preferably distributing the load associated with those tablets across many servers.

Figure 4A:
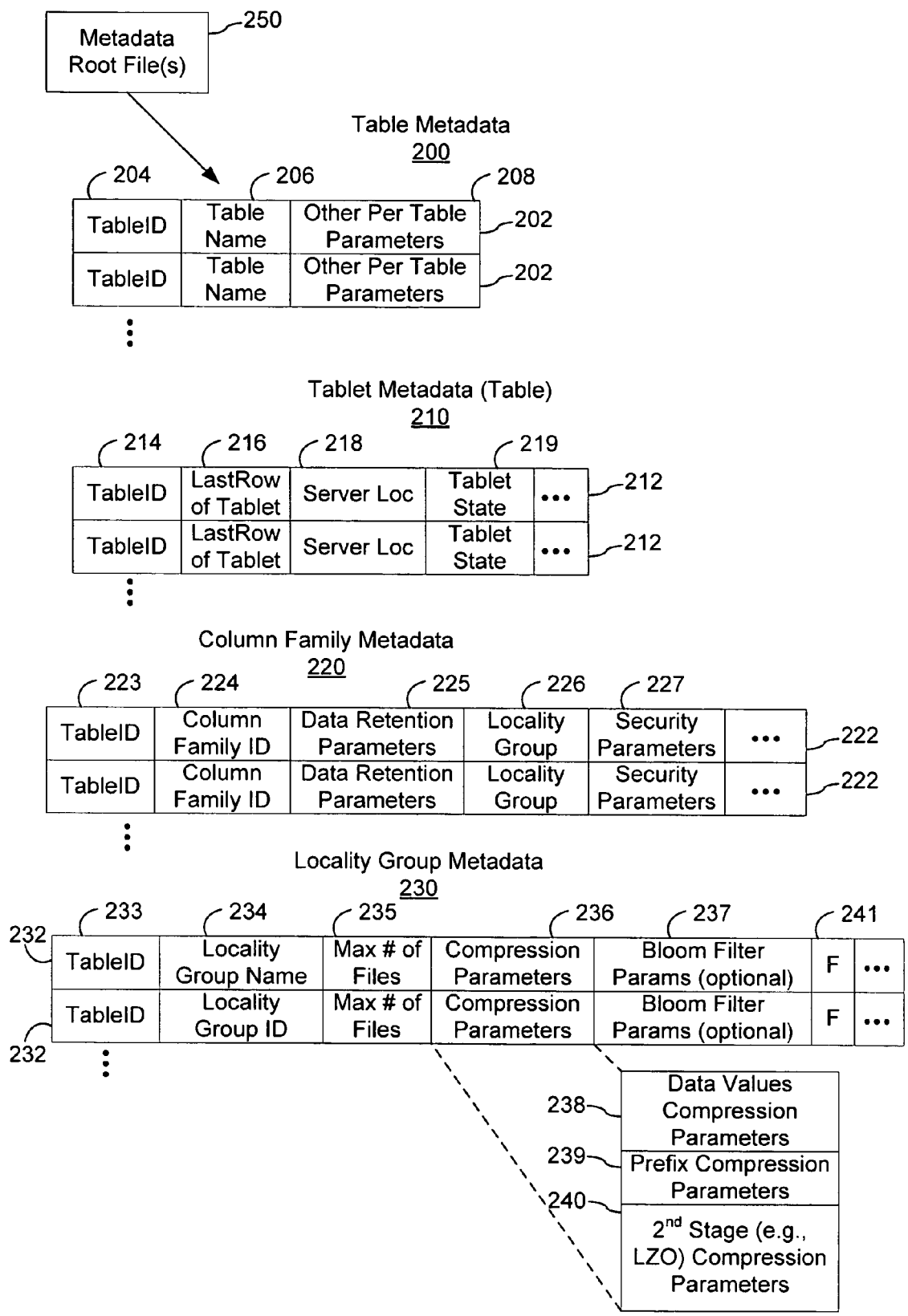
FIGS. 4A and 4B are block diagrams of data structures for storing metadata associated with a set of tables.
Figure 4B:
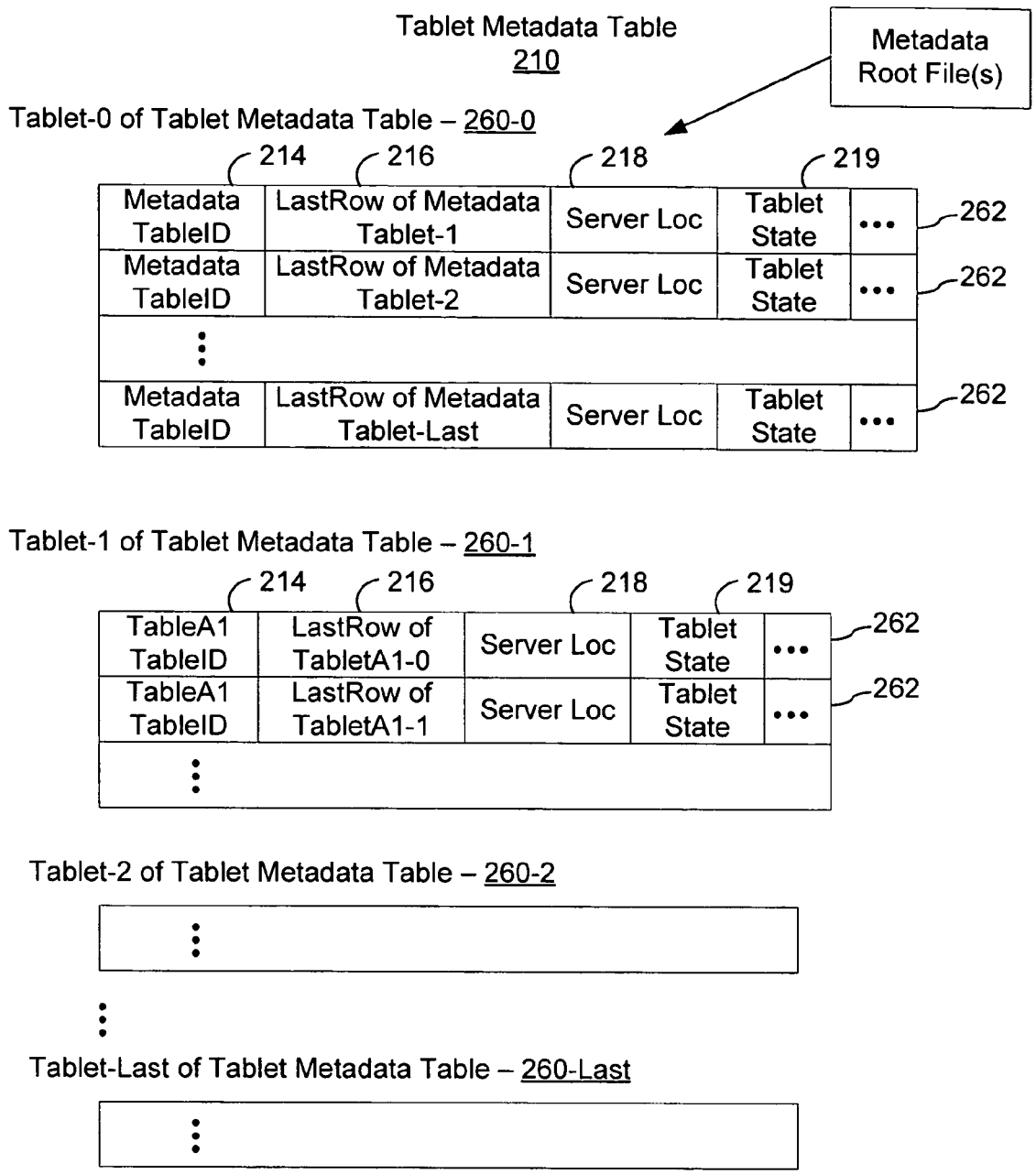

FIGS. 4A and 4B are block diagrams of data structures for storing metadata associated with a set of tables. These figures show four sets of metadata: table metadata 200 (sometimes called per table metadata), tablet metadata 210 (per tablet metadata), column family metadata 220 and locality group metadata 230. One or more metadata root files 250 may be used to store the location of the metadata tables, tablets or files, and thus to bootstrap the system when recovering from a power failure or the like. Some of the metadata sets, such as the table metadata 200 and the column family metadata 220, are sufficiently small that they may be stored in a small number of files having predefined names. At least one of the metadata sets, namely the tablet metadata 210, is sufficiently voluminous in some embodiments that this metadata is itself stored in a table data structure, which in turn has many tablets. In some embodiments, the tablet metadata table 210 contains thousands, hundreds of thousands or millions of entries 212, each of which indicates the location of a distinct respective tablet in the data center (or distributed computer system) 150.

In some embodiments the table metadata 200 includes a record 202 for each distinct table stored in a single data center 150 (i.e., the distributed system of FIG. 3). Each table metadata record 202 may include a table identifier 204, a name of the table 206, and optionally may include other per table parameters 208 (e.g., the identifier of an administrator or creator of the table).

In some embodiments, the tablet metadata 210 includes a record 212 for each distinct tablet stored in a single data center 150. Each tablet metadata record 212 may include a table identifier 214, the name of the last row of the tablet 216, an identifier or location 218 of the server to which the tablet is assigned (i.e., the server which handles access to and updates to the tablet), and a set of information 219 representing the state of the tablet. In some embodiments, tablet state information 219 includes a list of the files (see files 300, 302, FIG. 5) that store the content of the tablet, a list of the sub-log files 320, 322 (FIG. 5) that would be needed to recover the state of the tablet in a failover, and a log position indicating the position of the first update record in the shared log 164 to be used for recovering the state of the tablet in a failover. The tablet metadata records 212 may optionally include additional fields. The combination of the table identifier 214 and last row name or identifier 216 may be considered to be the key of the tablet metadata table 210, because all the tablet metadata records 212 are ordered within the tablet metadata table 210 in accordance with the table identifier concatenated with the last row name or identifier. In some other embodiments, each tablet metadata record may include the table identifier and the name of the first row of the next tablet in the table as the key of tablet metadata table. If a tablet is the last tablet of a table, a predefined "infinity" designation may be used in place of the name of the (non-existent) first row in the next tablet in the table.

The range of rows included in any particular tablet is specified by the last row name or identifiers in two tablet metadata records 212: the record 212 of the particular tablet and the immediately preceding record 212 in the tablet metadata table. If the immediately preceding record 212 in the tablet metadata table has a different table identifier, then the current tablet is the first tablet of its table.

To locate the tablet that stores a specified row of a table, the tablet metadata 210 is searched or scanned until the first tablet metadata record is found that (A) has the same table identifier as the tablet and (B) has a last row that is equal (i.e., has the same value or sort value) or greater (i.e., has a higher value, or sort value) than the specified row. This record identifies the tablet that stores the specified row, and the server location 218 specified by the record identifies the server which handles access to the identified tablet. In the embodiments where the tablet key is the table identifier and the name of the first row of the next tablet of the table, the record identifying the tablet that stores a specified row of a table is located by scanning the tablet metadata until the first tablet metadata record is found that (A) has the same table identifier as the tablet and (B) has a first row (of the next tablet) name that is greater (i.e., has a higher value, or sort value) than the specified row.

In some embodiments, the servers 154 and the master 152 of the data center may each maintain a cache of recently accessed tablet-to-location mappings. This may speed up the process of locating tablets by having locations for frequently accessed tablets more readily available.

As shown in FIG. 4B, in a first tablet 260-0 of the tablet metadata table 210 all the entries 262 have table identifiers 214 equal to the predefined identifier of the tablet metadata table. In addition, the last row field 216 of each entry 262 of the first tablet 260-0 matches the concatenation of the table identifier 214 and the last row 216 of a last entry 262 in another respective one of the tablets 260 (e.g., tablet 260-1) of the tablet metadata table 210. The server that hosts the first tablet 260-0 of the tablet metadata table 210 is identified by a metadata root file 250, which has a predefined file name and can therefore be located whenever the distributed computer system 150 is restarted. Thus, to retrieve a value having a specified key in a specified table, the process is as follows. This description assumes the tablet locations haven't been cached. The first tablet 260-0 of the tablet metadata is searched to identify and locate the tablet metadata tablet for the specified table. Then the identified tablet metadata tablet is searched to locate the entry for the specified key, which identifies the tablet containing the specified key-value pair and also identifies the server that hosts the tablet. Finally, the process continues at the hosting server, by searching the identified tablet to locate the value at the specified key. For many data access operations, one or both metadata entries in the tablet metadata will have been cached, making the access process even more efficient.

Referring again to FIG. 4A, in some embodiments, the column family metadata 220 includes a record 222 for each column family of each distinct table stored in a single data center 150. Each column family metadata record 222 may include a table identifier 223, the name or identifier 223 of the column family 216, a set of data retention parameters 225, and the name or identifier of the locality group 226 to which the column family is assigned. Column family metadata records 222 may optionally include additional fields. In some embodiments, the column family metadata 220 is stored on a per-table basis and may be stored together with the table metadata 200 and the locality group metadata 230. In these embodiments, the table metadata 200, column family metadata 220 and locality group metadata 230 for each distinct table are stored together in a corresponding metadata file.

In some embodiments, the data retention parameters 225 can include a parameter that specifies a maximum number of data items to be retained in each cell of the column family. Alternately stated, when a non-zero value maximum number is provided, and the data items stored in a cell exceed the specified maximum number, the oldest data items in the cell (as indicated by the timestamps or versions numbers of the data items) can be deleted or garbage collected until the number of items in the cell is reduced to the specified maximum number. The garbage collection of excess data items need not occur immediately, and thus may be performed at scheduled times or whenever the load on the server falls below a predefined level.

In some embodiments, the data retention parameters 225 can include a parameter that specifies a maximum age (also called an age limit) of data items to be retained in each cell of the column family. Alternately stated, when a non-zero value maximum age is provided, and any of the data items stored in a cell have an age (as indicated by the timestamps of the data items) that exceeds the specified maximum age, those data items in the cell can be deleted or garbage collected. The garbage collection of data items whose age is greater than the specified age limit need not occur immediately, and thus may be performed at scheduled times or whenever the load on the server falls below a predefined level.

In some embodiments, the data retention parameters 225 can include a first parameter that specifies a maximum age and a second parameter that specifies a maximum number of data items per cell in the column family.

In some embodiments, the column family metadata may include security parameters 227 to govern access to data in any of the columns in the column family. For instance, these parameters may restrict access so that ordinary users have only read access to the data in the columns of the column family, while other classes of users, such as those with administrator rights, have both read and write access. The access rights for one column family in a table may differ from the access rights for another column family in the same table.

In some embodiments, the locality group metadata 230 includes a record 232 for each locality group of each distinct table stored in a single data center 150. Each locality group metadata record 232 may include a table identifier 233, the name or identifier 234 of a respective locality group, a field 235 indicating the maximum number of files used to store the locality group, and a set of compression parameters 236. The locality group metadata records 232 may optionally include a set of Bloom filter parameters 237, and may optionally include additional fields, such as a location flag 241. In some embodiments, the compression parameters 236 include one set of compression parameters 238 for compressing the data values in a locality group, another set of compression parameters 239 for compressing the key values in a locality group, and yet another set of compression parameters 240 for performing a secondary compression of the result produced by compressing the data values and keys. In some embodiments, a key value may include a string of four values such as r.cf.c.ts, where "r" represents a row identifier, "cf" represents a column family name or identifier, "c" represents a column name or identifier and "ts" represent a timestamp or version number or version identifier. As described in more detail below, the values in a table data structure may be stored as key-value pairs, where each key identifies the location of the value in the table, as well as the timestamp or version number of the corresponding value. Every key in a table, tablet or locality group is unique with respect to all the other keys in the same table, tablet or locality group. In some embodiments, the locality group metadata 230 is stored on a per-table basis and may be stored together with the table metadata 200 and the column family metadata 220. In these embodiments, the table metadata 200, column family metadata 220 and locality group metadata 230 for each distinct table are stored together in a corresponding metadata file.

The optional Bloom filter parameters 237 are provided when a Bloom filter is used to block attempts to access non-existent entries in the locality group. In some embodiments, when Bloom filters are used with a locality group, the Bloom filters are stored in each of the files used to the store the locality group (i.e., each file includes its own Bloom filter). Every time an item is added to the locality group, within a particular tablet, the key of the item is hashed and used to update the Bloom filter. Whenever an attempt is made to read the item corresponding to a specified key, the Bloom filter is checked to see if the locality group, within the particular tablet, contains or may contain the item. If the Bloom filter returns a negative result, the item is known to not be present in the locality group of the particular tablet, while if the Bloom filter returns a positive result, a value corresponding to the key is likely (but less than 100 percent certain) to be found in the locality group of the particular tablet. The Bloom filter parameters 237 may specify which of the locality group's files have Bloom filters. In some embodiments, the Bloom filter parameters 237 may also specify the number of hash functions to be used and/or the size of the Bloom filter array, while in other embodiments the number of hash functions and the size of the Bloom filter array are automatically determined.

The location flag 241 may be set or reset by a user to designate a locality group for loading into and keeping in volatile memory. For example, if the flag 241 for a locality group is set, then the locality group files corresponding to that locality group are loaded into volatile memory and kept in the volatile memory until the flag is cleared. If the flag 241 is cleared, then the locality group files corresponding to that locality group are not kept in volatile memory. Keeping locality group files in volatile memory may help speed up operations that access the files. It should be appreciated that the shared log is not affected by the state of the location flag.

Figures 5A, 5B:
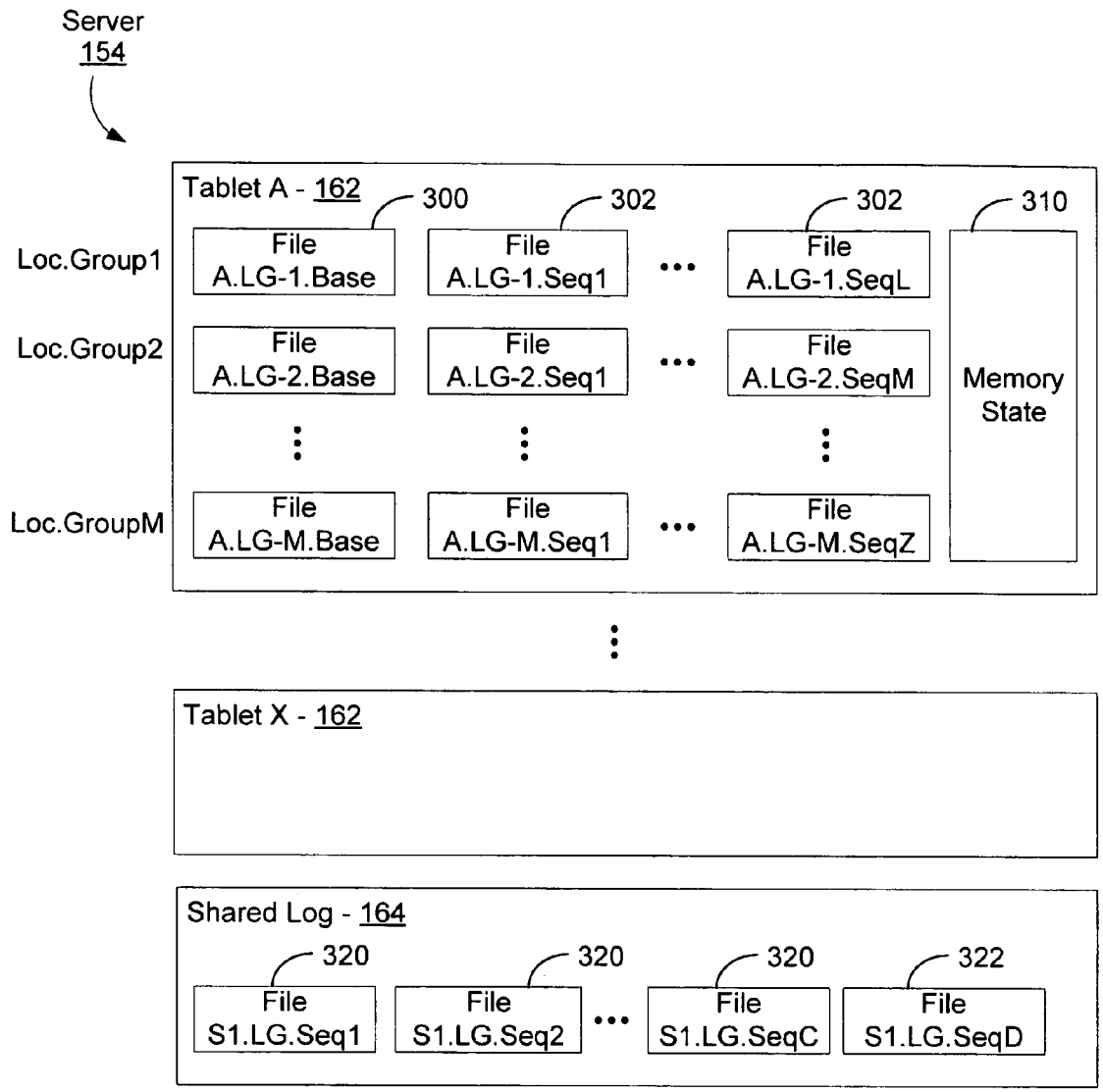

FIG. 5A is a block diagram of the files used by one server to store tablets 162 and updates to the tablets. As shown, for each locality group in a tablet 162, there is a main or base file 300, and a set of one or more update files 302. In addition, updates to the locality group of the tablet 162 since the last time an update file 302 was produced are stored in a memory state array 310, which is stored in the main memory of the server hosting the tablet 162. As shown in FIG. 5B, each of the locality group files 300, 302 and the memory state 310 contains sets of key-value pairs. In some embodiments, the key value pairs of each locality group file are stored in key sorted order (i.e., starting at a lowest key value in the file and progressing monotonically to the highest key value in the file, or vice versa) along with an index on the keys for fast access. Since the update files 302 of a locality group are created after the creation of the base file 300, the update files 302 may contain new values for some of the same keys found in the base file.

Whenever a compaction trigger event occurs (e.g., episodically, when the memory of a server reaches a predefined level of fullness, or the memory state array 310 reaches a predefined size or level of fullness; periodically, when the passage of a time since a last compaction reaches a predefined threshold; upon a split or merge of a tablet; upon the unloading of a tablet; and/or upon user request), the update information in the memory state array 310 is used to generate new update files 302 for the locality groups for which the memory state array 310 contains updates. If, as a result, the number of files for a locality group exceeds the maximum number of files allowed for that locality group (as specified by either the metadata for the locality group, or by a default value), then two or more of the update files 302 are combined so as to reduce the number of update files 302. In an alternate embodiment, when the number of update files 302 is already at its maximum allowed value for a locality group, the update information in the memory state 310 is added to the newest of the update files.

When performing a "compaction," which means combining two or more locality group files 300, 302, if the same key is found in two files 300, 302, then the newer value for the key is retained and the older value is discarded. If the newer "value" is a deletion, all older values for the key are discarded if the compaction compacts to the base file. If the compaction does not compact to the base file, the deletion "value" is retained.

In some embodiments, a compaction trigger event may trigger either a minor compaction or a major compaction. For example, a minor compaction is triggered when a server's memory reaches a predefined level of fullness. Memory fullness may be based, for example, on the total amount of data stored in the memory state arrays 310 for all the tablets hosted by the server. When a minor compaction is triggered, the server identifies one or more tablets whose memory state arrays have the most data in them, and then writes the information from each of those memory state arrays 310 into one or more locality group files 302. The memory state array 310 is then re-initialized to a predefined empty state. In some embodiments, the minor compaction is performed on successive tablets until the fullness of the server's memory falls below a predefined threshold level of fullness. In other embodiments, each minor compaction trigger event causes only one tablet's memory state array 310 to be converted into one or more locality group files 302. The tablet whose memory state array 310 is converted is selected based on the amount of data stored in the memory state arrays 310 of the tablets hosted by the server, or on a round robin ordering of minor compactions, or on any other appropriate selection mechanism or rule. As noted above, a minor compaction may also include merging locality group files 302 when the number of locality group files for any particular locality group exceeds the maximum number of such locality group files specified for that locality group.

A major compaction is the combining of the base file 300 and all the update files 302 of a locality group so as to form a new base file 300. In some embodiments, a major compaction is triggered periodically, for instance once per day. In these embodiments, a compaction thread is launched upon the triggering of a major compaction. The compaction thread performs a major compaction on the locality files of each tablet, one locality group at a time, within one tablet at a time, until the sets of locality group files of all the tablets hosted by the server have been compacted to form new locality group base files 300. In some other embodiments, major compactions are performed on the locality groups of a tablet, one at a time, in round robin order during successive compaction events. Periodically compacting all the locality group files 300, 302 of each locality group into new base files helps to keep access to the data in the tablets efficient and ensures that deleted data are eventually removed from the system.

In an alternate embodiment, the server 154 includes a separate memory state array 310 for each locality group of each tablet hosted by the server 154.

Each tablet or data server includes a shared log 164. Whenever an update is made to a tablet hosted by the server 164, the update is first committed to the shared log 164, and only when the update is know to be committed to the shared log 164 is the update applied to the memory state array 310. The shared log 164 is stored as a sequence of sub-log files 320. In some embodiments, new updates are added to a current sub-log file 322 until the sub-log file reaches a threshold size, or until a new addition to the current sub-log file 322 would cause the size of the sub-log file to exceed a threshold value. At that point, the current sub-log file is closed and a new sub-log file is created and becomes the current sub-log file to which new updates are added.

The shared log 164 stores a sequence of update records. Each update record indicates a new value for a specified key; the deletion of the value (if any) at a specified key; the deletion of a cell at a specified row and column; or the deletion of an entire row. In some embodiments, a single update record may indicate the deletion of a subset of multiple versions of data values at a cell.

In some embodiments, the tablets, column families, and locality groups are non-overlapping. This means that that a row cannot belong to two tablets at the same time and a column cannot be assigned to two column families or two locality groups at the same time; the ranges of rows between tablets are mutually exclusive and the ranges of columns between column families or between locality groups are mutually exclusive. For example, if a table has rows A, B, C, D, E, the table has two tablets, and a first tablet of the table contains rows A, B, C; then the second tablet contains rows D, E and cannot contain rows A, B, or C because rows A, B, C already belong to the first tablet. As another example, if a table has columns P, Q, R, S, T, the table has two column families, and a first column family of the table contains columns P, Q, R; then the second column family contains columns S, T and cannot contain columns P, Q, or R because columns P, Q, R are already assigned to the first column family.

Figure 6:
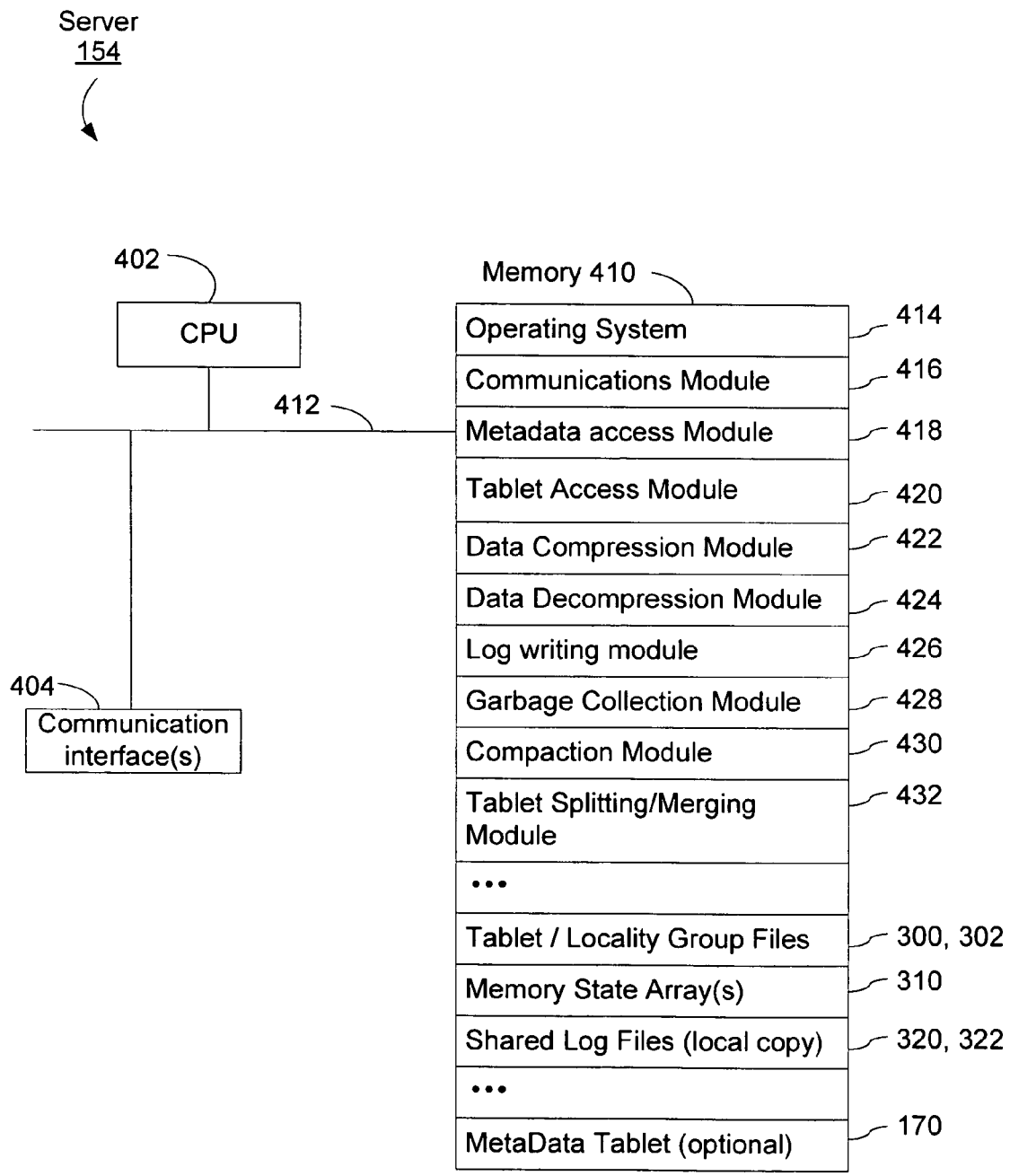
FIG. 6 is a block diagram of a computer, such as a server (sometimes called a data server or tablet server), that participates in a distributed system in which data is stored in a set of tables, portions of which are stored and maintained across a number of interconnected servers.

In some embodiments, a data or tablet server 154, as shown in FIG. 6, includes one or more processing units (CPU's) 402, one or more network or other communications interfaces 404, memory 410, and one or more communication buses 412 for interconnecting these components. Memory 410 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 410 may optionally include one or more storage devices remotely located from the CPU (s) 402. In some embodiments, the memory 410 stores the following programs, modules and data structures, or a subset thereof:
- an operating system 414 that includes procedures for handling various basic system services and for performing hardware dependent tasks;
- a network communication module 416 that is used for connecting the server 154 to other computers via the one or more communication network interfaces 404 and one or more communication networks, such as a local area network, the Internet, other wide area networks, metropolitan area networks, and so on;
- a metadata access module 418 for accessing the metadata for any specified table, tablet, column family or locality group;
- a tablet access module 420, for accessing (i.e., reading and/or writing) data in a specified tablet at a specified row and column of a specified table;
- a data compression module 422 for compressing files; the data compression module 422 may perform data compression of locality group files 300, 302 in accordance with the compression parameters 236 specified for the corresponding locality groups;
- a data decompression module 424 for decompressing compressed files;
- a log writing module 426, for writing update records to a log file, such as the shared log files 320, 322 described above;
- a garbage collection module 428 for garbage collecting (i.e., deleting) data that exceeds in number or age the data retention rule or parameters specified for a column family;
- a compaction module 430, for compacting or combining locality group files 300, 302, as described above; and
- a tablet splitting/merging module 432, for splitting tablets to increase the number of tablets or merging tablets to decrease the number of tablets.

As described elsewhere in this document, memory 410 of a data or tablet server may also store a number of files and data structures, including tablet files (i.e., locality group files 300, 302), one or more memory state arrays 310, and shared log files 320, 322. Optionally, memory 410 may also store one or more metadata tablets 170, each of which may include one or more sets of locality group files.

Each of the above identified elements of FIG. 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 6 shows a data or tablet server, FIG. 6 is intended more as functional description of the various features which may be present in a data or tablet server, or set of such servers, than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of storing data in a computer memory, comprising:
storing each of a plurality of data items in a table data structure in the computer memory including associating a row identifier and column identifier with each respective data item and storing the respective item at a logical location in the table data structure specified by the row identifier and column identifier;
associating a first set of data access permissions with a first group of columns in the table data structure, and associating a second set of data access permissions with a second group of columns in the table data structure, wherein the first and second groups of columns are non-overlapping groups of columns and the first and second sets of data access permissions differ with respect to the data access permissions granted to at least one user or group of users; and
storing in a cell of the table data structure a plurality of data items, and associating a timestamp with each of the plurality of data items stored in the cell, each of the plurality of data items stored in the cell having a same row identifier, a same column identifier, and a distinct time stamp.

2. The method of claim 1, wherein associating a row identifier with a respective data item includes associating a row identifier string with the respective data item, the row identifier string comprising a string of arbitrary length and arbitrary value.

3. The method of claim 1, wherein associating a row identifier and column identifier with a respective data item includes associating a row identifier string and column identifier string with the respective data item, the row identifier string and column identifier string each comprising a respective string of arbitrary length and arbitrary value.

4. The method of claim 1, including associating a data retention rule with a group of columns of the table data structure, the group of columns including the cell, wherein the data retention rule specifies that data items stored in cells in the group of columns are eligible for deletion when their age, as determined by the timestamps associated with the data items, exceeds an age specified by the data retention rule.

5. The method of claim 4, including automatically deleting data items in the group of columns whose age, as determined by the timestamps associated with the data items, exceeds the age specified by the data retention rule.

6. The method of claim 1, including
associating a data retention rule with a group of columns of the table data structure, the group of columns including the cell, wherein the data retention rule specifies that oldest data items stored in each respective cell in the group of columns are eligible for deletion when the number of data items stored in the respective cell in the group of columns exceeds a number specified by the data retention rule.

7. The method of claim 6, including automatically deleting one or more oldest data items in the group of columns from cells that have more data items than the number specified by the data retention rule.

8. The method of claim 1, wherein the table data structure includes a plurality of tablets, comprising distinct non-overlapping groups of rows of the table data structure, and wherein the table data structure includes a plurality of locality groups, each including a distinct non-overlapping subset of the columns of the table data structure.

9. The method of claim 8, including storing the tablets in a plurality of distinct servers, including storing for each tablet a plurality of files corresponding to the plurality of locality groups.

10. A system for storing data, comprising:
a set of interconnected computers each having storage;
a table data structure, the table data structure including a plurality of rows and columns for storing data, wherein the rows have associated row identifiers, the columns have associated column identifiers, and each of a plurality of data items is stored in the table data structure at a respective cell in the table data structure specified by a respective row identifier and respective column identifier;
wherein the table data structure includes a first set of data access permissions associated with a first group of columns in the table data structure, and a second set of data access permissions associated with a second group of columns in the table data structure, wherein the first and second groups of columns are non-overlapping groups of columns and the first and second sets of data access permissions differ with respect to the data access permissions granted to at least one user or group of users;
wherein a respective cell in the table stores a plurality of data items, each of the data items stored in the cell having associated therewith a respective timestamp, each of the plurality of data items stored in the cell having a same row identifier, a same column identifier, and a distinct timestamp; and
wherein the table data structure is stored within the storage of one or more of the set of interconnected computers.

11. The system of claim 10, wherein the table data structure is stored within the storage of two or more of the set of interconnected computers.

12. The system of claim 10, wherein each respective cell of the table data structure has a row identifier comprising a string of arbitrary length and arbitrary value.

13. The system of claim 12, wherein each respective cell of the table data structure has a column identifier comprising a string of arbitrary length and arbitrary value.

14. The system of claim 10, wherein the table data structure includes a data retention rule associated with a group of columns of the table data structure, wherein the data retention rule specifies that data items stored in cells in the group of columns are eligible for deletion when their age, as determined by the timestamps associated with the data items, exceeds an age specified by the data retention rule.

15. The system of claim 14, including executable instructions for automatically deleting data items in the group of columns whose age, as determined by the timestamps associated with the data items, exceeds the age specified by the data retention rule.

16. The system of claim 10, wherein the table data structure includes a data retention rule associated with a group of columns of the table data structure, wherein the data retention rule specifies that oldest data items stored in each respective cell in the group of columns are eligible for deletion when the number of data items stored in the respective cell in the group of columns exceeds a number specified by the data retention rule.

17. The system of claim 16, including executable instructions for automatically deleting one or more oldest data items in the group of columns from cells that have more data items than the number specified by the data retention rule.

18. The system of claim 10, wherein the table data structure includes a plurality of tablets, comprising distinct non-overlapping groups of rows of the table data structure, and wherein the table data structure includes a plurality of locality groups, each including a distinct non-overlapping subset of the columns of the table data structure.

19. The system of claim 18, wherein the tablets are stored in the storage of two or more the interconnected computers, including storing for each tablet a plurality of files corresponding to the plurality of locality groups.

20. A method of storing data in a computer memory, comprising:
storing each of a plurality of data items in a table data structure in the computer memory including associating a row identifier and column identifier with each respective data item and storing the respective item at a logical location in the table data structure specified by the row identifier and column identifier;
storing in a cell of the table data structure a plurality of data items, and associating a timestamp with each of the plurality of data items stored in the cell, each of the plurality of data items stored in the cell having a same row identifier, a same column identifier, and a distinct timestamp; and
associating a data retention rule with a group of columns of the table data structure, the group of columns including the cell, wherein the data retention rule specifies that oldest data items stored in each respective cell in the group of columns are eligible for deletion when the number of data items stored in the respective cell in the group of columns exceeds a number specified by the data retention rule.

21. The method of claim 20, including automatically deleting one or more oldest data items in the group of columns from cells that have more data items than the number specified by the data retention rule.

22. A system for storing data, comprising:

a set of interconnected computers each having storage;

a table data structure, the table data structure including a plurality of rows and columns for storing data, wherein the rows have associated row identifiers, the columns have associated column identifiers, and each of a plurality of data items is stored in the table data structure at a respective cell in the table data structure specified by a respective row identifier and respective column identifier;

wherein the table data structure includes a data retention rule associated with a group of columns of the table data structure, wherein the data retention rule specifies that oldest data items stored in each respective cell in the group of columns are eligible for deletion when the number of data items stored in the respective cell in the group of columns exceeds a number specified by the data retention rule;

wherein a respective cell in the table stores a plurality of data items, each of the data items stored in the cell having associated therewith a respective timestamp, each of the plurality of data items stored in the cell having a same row identifier, a same column identifier, and a distinct timestamp; and wherein the table data structure is stored within the storage of one or more of the set of interconnected computers.

23. The system of claim 22, including executable instructions for automatically deleting one or more oldest data items in the group of columns from cells that have more data items than the number specified by the data retention rule.

* * * * *

UNITED STATES PATENT AND TRADEMARK OFFICE
CERTIFICATE OF CORRECTION

| | | |
|---|---|---|
| PATENT NO. | : 7,428,524 B2 | Page 1 of 1 |
| APPLICATION NO. | : 11/197925 | |
| DATED | : September 23, 2008 | |
| INVENTOR(S) | : Burrows et al. | |

It is certified that error appears in the above-identified patent and that said Letters Patent is hereby corrected as shown below:

Column 12, line 46, between "more" and "the" please insert -- of --.

Signed and Sealed this

Eighteenth Day of November, 2008

JON W. DUDAS
*Director of the United States Patent and Trademark Office*